United States Patent [19]

Freeman

[11] 4,264,924
[45] Apr. 28, 1981

[54] DEDICATED CHANNEL INTERACTIVE CABLE TELEVISION SYSTEM

[76] Inventor: Michael J. Freeman, 12 Maplewood Rd., Hartsdale, N.Y. 10530

[21] Appl. No.: 66,161

[22] Filed: Aug. 13, 1979

Related U.S. Application Data

[63] Continuation-in-part of Ser. No. 883,262, Mar. 3, 1978, abandoned, and a continuation-in-part of Ser. No. 903,851, May 8, 1978, abandoned.

[51] Int. Cl.³ .............................................. H04N 7/10
[52] U.S. Cl. ...................... 358/86; 358/142; 358/143
[58] Field of Search .................. 358/86, 93, 142, 143; 35/9 A, 9 B, 48 R; 455/3, 4, 5; 370/76; 360/72.2, 74.4, 74.7

[56] References Cited

U.S. PATENT DOCUMENTS

| | | | |
|---|---|---|---|
| 2,777,901 | 1/1957 | Dostert | 35/8 A |
| 2,826,828 | 3/1958 | Hamilton | 35/9 R |
| 2,908,767 | 10/1959 | Fritzinger | 360/74.7 |
| 2,921,385 | 1/1960 | Hamilton | 35/9 R |
| 3,020,360 | 2/1962 | Gratian | 360/1 |
| 3,194,845 | 7/1965 | Treadwell | 360/72.2 |
| 3,245,157 | 4/1966 | Laviana | 358/93 |
| 3,255,536 | 6/1966 | Livingston | 35/9 R |
| 3,273,260 | 9/1966 | Walker | 358/142 |
| 3,284,923 | 11/1966 | Leslie | 35/8 R |
| 3,343,280 | 9/1967 | Tolnai | 35/35 C |
| 3,477,144 | 11/1969 | Stillit | 35/9 R |
| 3,484,950 | 12/1969 | Serrell | 35/9 R |
| 3,538,621 | 11/1970 | Mayeda | 35/9 E |
| 3,546,791 | 12/1970 | Koos | 358/93 |
| 3,623,238 | 11/1971 | Laplume | 35/9 A |
| 3,665,615 | 5/1972 | Laplume | 35/9 A |
| 3,708,891 | 1/1973 | Rosov | 35/9 A |
| 3,757,225 | 9/1973 | Ulicki | 358/86 |
| 3,763,577 | 10/1973 | Goodson | 35/48 R |
| 3,774,316 | 11/1973 | Meier | 35/8 A |
| 3,814,841 | 6/1974 | Ulicki | 358/86 |
| 3,947,972 | 4/1976 | Freeman | 360/121 |
| 4,078,316 | 3/1978 | Freeman | 35/9 R |

*Primary Examiner*—Howard W. Britton
*Attorney, Agent, or Firm*—Hubbell, Cohen, Stiefel & Gross

[57] ABSTRACT

An interactive cable television system, such as a one-way system, in which a plurality of subscribers are simultaneously provided with multi-information television programming and regular television programming independently selectably directly receivable by the individual subscribers on the television reception channels of a conventional multichannel television receiver. The multi-information television programming comprises a plurality of different program information message signals related in time and content to each other and each transmitted at a different associated communication frequency which corresponds to a different television reception channel associated frequency, with regular television programming being simultaneously provided at one or more further different television reception channel frequency. Video information corresponding to labels to be dynamically assigned to the various television reception channels associated with the multi-information television programming is provided in the multi-information packet, which labels are varied in accordance with the content of the packet. A plurality of successive individual packets and the various program information message signals contained therein may be related to each other in a decision tree relationship in a memory accumulation program format capable of providing individually tailored messages to the individual subscribers, or in a story formulation program format enabling independent story creation by the individual subscribers or in a real time limited memory type of format responsive to prior selections of the individual subscribers or in any other type of interactive conversational type of programming.

14 Claims, 17 Drawing Figures

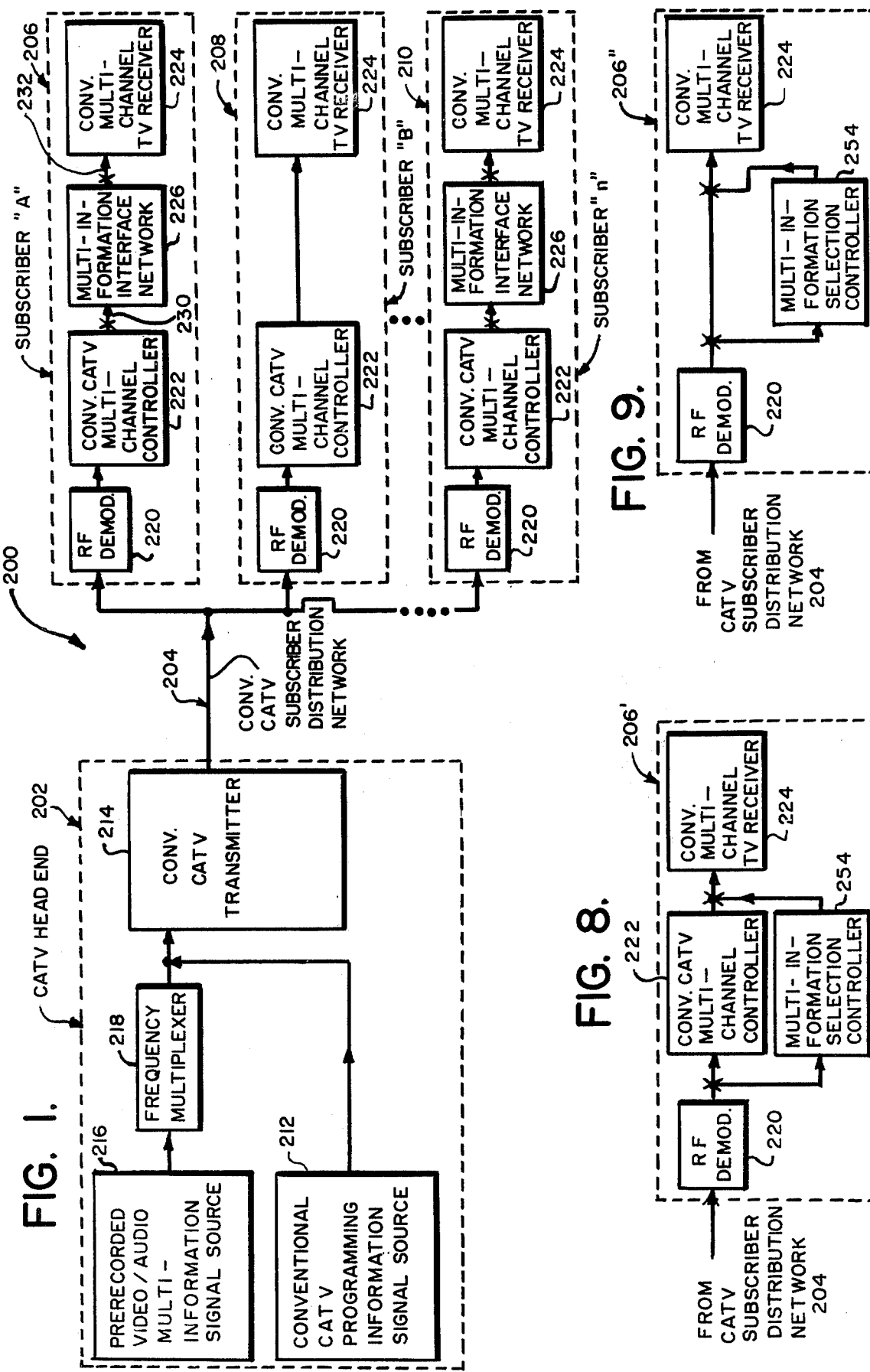

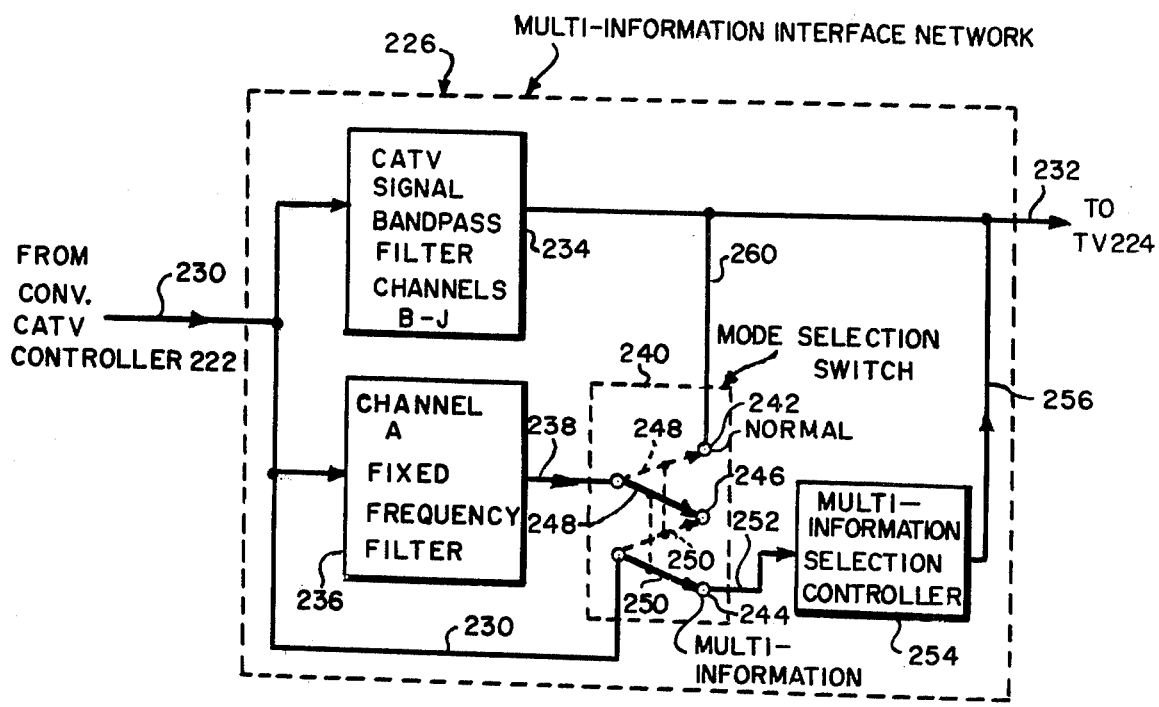

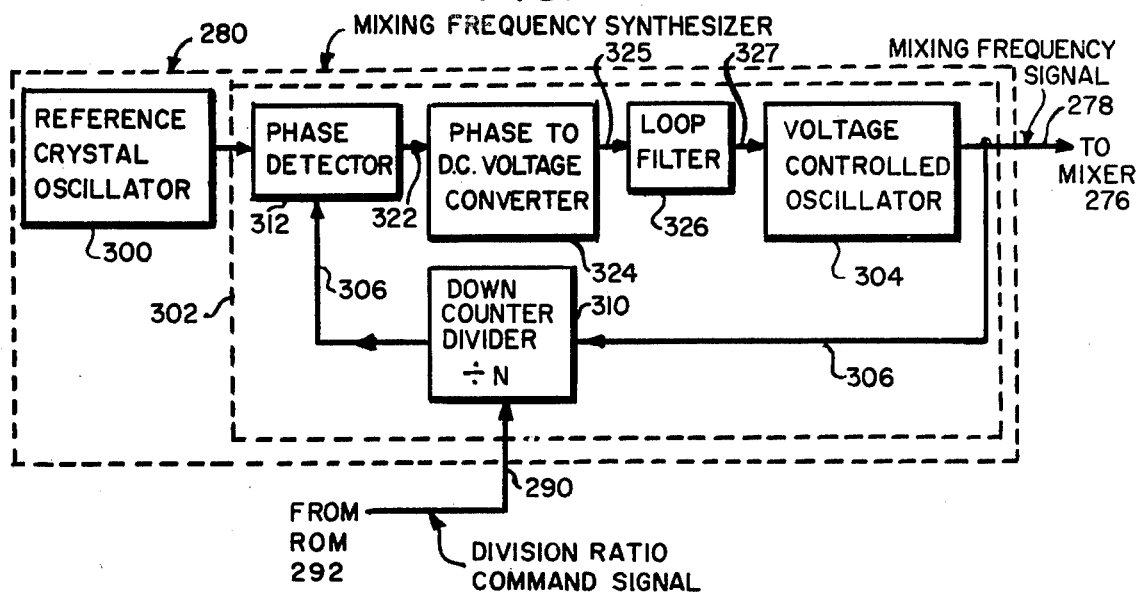
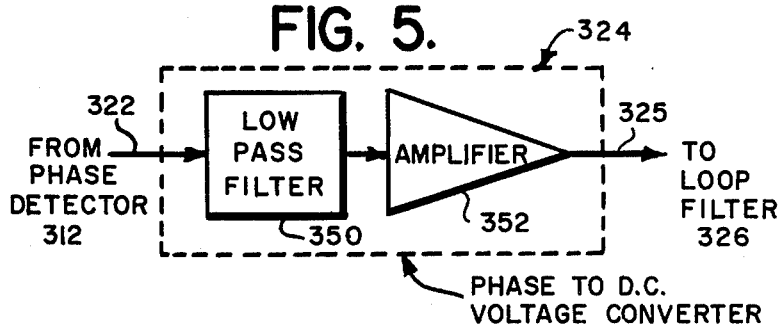
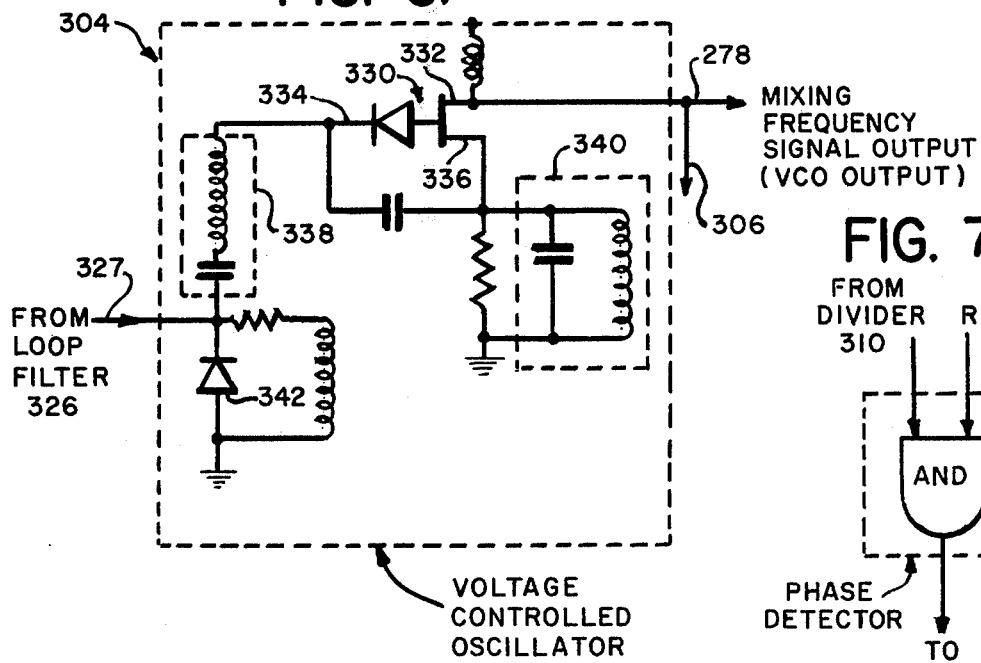
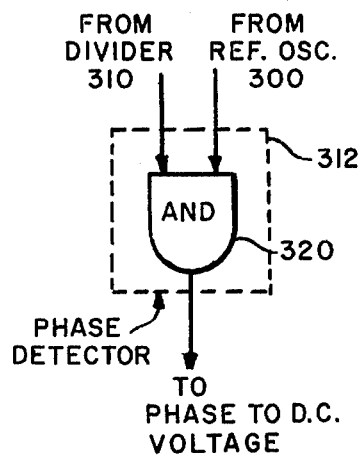

DEDICATED CHANNEL INTERACTIVE CABLE TELEVISION SYSTEM

CROSS-REFERENCE TO RELATED APPLICATIONS

This application is a continuation-in-part of my copending U.S. patent application Ser. No. 883,262, filed Mar. 3, 1978 and entitled "Real Time Conversational Type Interactive Television System", now abandoned and my copending U.S. patent application Ser. No. 903,851, filed May 8, 1978 and entitled "Method of Providing Variable Interactive Audio Response From a Common Multichannel Recording Medium and Storage Medium Provided Thereby", now abandoned and is related to the commonly owned contemporaneously filed U.S. patent application of myself and Lawrence G. Kurland entitled "Interactive Cable Television System", bearing U.S. Pat. application Ser. No. 66,162, filed Aug. 13, 1979 as well as my previous U.S. Pat. Nos. 3,947,972 and 4,078,316, entitled, respectively "Real Time Conversational Response Teaching Apparatus" and "Real Time Conversational Toy", the contents of all of which are specifically incorporated by reference herein in their entirety.

BACKGROUND OF THE INVENTION

1. Field of the Invention

The present invention relates to cable television systems and particularly to interactive cable television systems.

2. Description of the Prior Art

Real time conversational student response teaching apparatus are known such as described in U.S. Pat. Nos. 3,947,972 and 4,078,316. In addition, multiple choice student response systems are well known, such as exemplified by the systems disclosed in U.S. Pat. Nos. 2,921,385; 3,020,360; 2,826,828; 3,623,238; 3,546,791; 3,273,260; 3,665,615; 3,245,157; 3,284,923; 3,538,621; 3,477,144; 3,708,891; 3,255,536; 2,777,901; 2,908,767; 3,774,316; 3,194,895; 3,484,950; 3,343,280; and 3,763,577, by way of example. None of these prior art systems, however, has been adapted to be employed in connection with conventional cable television in which an essentially one way system is convertible on a subscriber-by-subscriber basis into what appears to be a two way interactive network in which the television programming information to be received by the individual subscribers is individually selectable to enable the subscriber to receive either selectable multi-information television programming and/or regular television programming on the television reception channels of a conventional multichannel television receiver. Moreover, although prior art subscription cable television systems per se are known in which a plurality of unrelated television programs, under control of a computer, are transmitted over a common television channel for selection by the individual subscribers, such as disclosed in U.S. Pat. Nos. 3,814,841 and 3,757,225, no such systems are known to applicants which are one way interactive systems capable of independent subscriber selectable reception of simultaneously transmitted multi-information television programming and regular television programming over a common designated television reception channel. Such an arrangement would greatly expand the educational and entertainment capabilities and horizons of cable television systems with the prior art essentially being concerned with a severely limited quantity of users. The desire to expand the educational capabilities and horizons of mass entertainment media has greatly increased with the advent of cable television in which considerably more channels than were previously available are present. Nevertheless, even though cable television has existed for a number of years, it has not been employed, to applicant's knowledge, in an interactive conversational type teaching or interactive entertainment system in which a mass audience of people, in addition to their regular programming, can receive individually controllable instantaneous real time effective interaction with the questions being asked, and/or individually tailored messages or entertainment. These disadvantages of the prior art are overcome by the present invention.

SUMMARY OF THE INVENTION

An interactive cable television system, such as a one-way system, in which a plurality of subscribers are simultaneously provided with multi-information television programming and regular television programming independently selectably directly receivable by the individual subscribers on the television reception channels of a conventional multichannel television receiver. The multiinformation television programming comprises a plurality of different program information message signals related in time and content to each other and each transmitted at a different associated communication frequency which corresponds to a different television reception channel associated frequency, with regular television programming being simultaneously provided at one or more further different television reception channel frequency. Video information corresponding to labels to be dynamically assigned to the various television reception channels associated with the multiinformation television programming is provided in the multiinformation packet, which labels are varied in accordance with the content of the packet. A plurality of successive individual packets and the various program information message signal contained therein may be related to each other in a decision tree relationship in a memory accumulation program format capable of providing individually tailored messages to the individual subscribers, or in a story formulation program format enabling independent story creation by the individual subscribers or in a real time limited memory type of format responsive to prior selections of the individual subscribers or in any other type of interactive conversational type of programming.

BRIEF DESCRIPTION OF DRAWINGS

FIG. 1 is a block diagram of the presently preferred overall interactive cable television system of the present invention, illustrating the presently preferred arrangement in which conventional regular CATV programming for a common television channel is substantially simultaneously transmitted from the CATV head end along with a subscriber selectable multi-information television program capable of reception on the same common channel in place of the regular programming information;

FIG. 2 is a block diagram of the presently preferred typical multi-information interface network portion employed in a typical individual subscriber television reception system in accordance with the presently preferred embodiment of the invention illustrated in FIG. 1;

FIG. 3 is a block diagram of a typical presently preferred multi-information selection controller portion of the multi-information interface network illustrated in FIG. 2;

FIG. 4 is a block diagram of a typical presently preferred mixing frequency synthesizer employed in the multi-information selection controller of FIG. 3;

FIG. 5 is a block diagram of a typical phase-to-DC voltage converter employable in the mixing frequency synthesizer of FIG. 4;

FIG. 6 is a schematic diagram of a typical voltage controlled oscillator portion of the mixing frequency synthesizer of FIG. 4;

FIG. 7 is a logic diagram of a typical phase detector portion of the mixing frequency synthesizer illustrated in FIG. 4;

FIGS. 8 and 9 are block diagrams of alternative embodiments for a typical subscriber television reception system usable when regular programming information for a designated television channel is not simultaneously transmitted from the CATV head end at the time that a subscriber selectable multi-information television program is being transmitted;

DETAILED DESCRIPTION OF PREFERRED EMBODIMENTS

Figure 10:
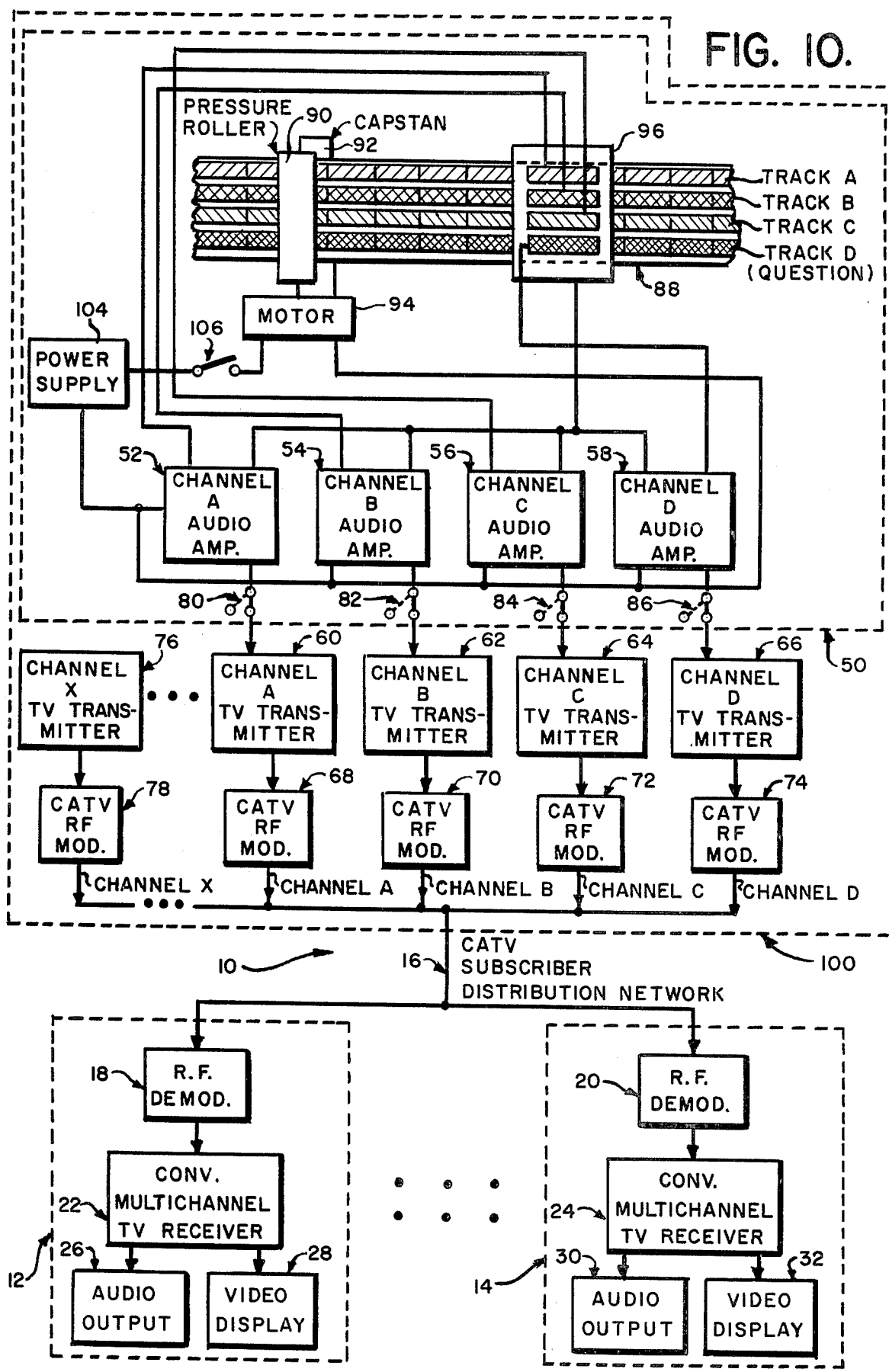
FIG. 10 is a diagrammatic illustration, partially in schematic and partially in block, of an alternative embodiment of the interactive cable television system of the present invention in which the multi-information television program is transmitted from the CATV head end with one channel being dedicated to each selection information message in a multi-information packet.

Before referring to the drawings in detail, it should be noted that FIGS. 1-9 specifically refer to the presently preferred overall system of the present invention described and claimed in the contemporaneously filed U.S. patent application of myself and Lawrence G. Kurland entitled "Interactive Cable Television System" bearing U.S. patent application Ser. No. 66,162 filed Aug. 13, 1979, and that FIGS. 10 and 11 specifically refer to my dedicated channel interactive cable television system to be described and claimed herein and also described, but not claimed, in the above contemporaneously filed U.S. patent application. FIGS. 11-14 refer to functions available in either the system of FIGS. 1-9 or the system of FIGS. 10 and 11.

Referring now to the drawings in detail, and initially to FIG. 1 thereof, a block diagram of the presently preferred overall interactive cable television system of the present invention, generally referred to by the reference numeral 200, is shown. Cable television system 200 preferably includes a CATV head end 202 which conventionally transmits the CATV television programming information, a conventional CATV subscriber distribution network 204, and a plurality of subscribers each having a subscriber television reception system, with three such typical subscriber television reception systems 206, 208, and 210, illustratively labeled subscriber "A", subscriber "B", and subscriber "n", respectively, in FIG. 1. As will be described in greater detail hereinafter, the CATV head end 202 is preferably conventional with the exception of the presently preferred arrangement utilized for providing subscriber selectable television programming multi-information capable of reception on a common designated television channel in place of the regular or conventional CATV television programming which is substantially simultaneously transmitted for that same designated television channel. As will also be described in greater detail hereinafter, as used herein throughout the specification and claims, the term "multi-information television programming" is meant to refer to a plurality of different selectable information messages, related in real time and content, only one of which will be subscriber selectably displayed at a particular time on the designated television reception channel but which may vary independently from subscriber to subscriber dependent on what information the subscriber selects for reception on the designated common television reception channel at that particular time. In the presently preferred system 200 of FIG. 1, the selectable multi-information television program is transmitted from the head end 202 through the CATV subscriber distribution network 204 along with conventional regular CATV television programming information for that designated channel and for the other television reception channels used by the normal CATV television system. As will be described in greater detail hereinafter with reference to FIGS. 2-7, the individual subscriber may then independently select between reception of the multi-information television program on the designated television reception channel and reception of the regular CATV television programming information for that designated channel, as well as individually independently selecting which of the plurality of different messages, related in real time and content, which are being substantially simultaneously transmitted at a given time in a multi-information packet, is to be received or displayed on the subscriber's conventional multichannel television receiver 224.

With respect to the CATV head end 202, it preferably includes a conventional CATV television programming information signal source 212 for providing multichannel cable television programming of a plurality of different programs in a conventional manner, a conventional CATV transmitter 214 capable of conventionally providing the plurality of different CATV programs to the subscriber distribution network 204 and therefrom to the individual subscriber television reception systems, a prerecorded video/audio multi-information television program signal source 216, to be described in greater detail hereinafter, for providing the multi-information packets for ultimate selectable display on the designated common television reception channel of the subscriber's conventional television receivers 224,224a in FIG. 1, and a conventional frequency multiplexer 218 for frequency multiplexing the multi-information television program signal output of multi-information television program source 216 to provide a frequency multiplexed input to the CATV transmitter 214 for conventional transmission through the subscriber distribution network 204 along with the conventional CATV programming from regular television program source 212. As will be described in greater detail hereinafter, prerecorded video/audio multi-information television program signal source 216 may be any conventional source capable of providing synchronized multiple information messages which are related in real time and content to each other, such as from a conventional multiple information storage media, such as multitrack tape in which each of the information tracks contains information messages related in real time and content to each other, such as will be described with reference to FIG. 10 by way of example, or a plurality of separate tapes whose operation is synchronized so as to relate the information messages or segments contained on the various tapes in real time and content to each other, or synchronized video discs, or any other conventional source of prerecorded video/audio information capable of providing a plurality of information messages related in real time and content to each other. Preferably, the output of the prerecorded video/audio multi-information television program signal source 216 comprises a plurality of substantially simultaneously transmitted different information signals related in real time and content to each other but each separated, such as preferably by frequency, from each other. Moreover, each of the assigned frequencies for the related different information signals is different from each other and is preferably at a frequency which is different from that of the associated communication frequency of the designated common television reception channel on the subscriber television receivers over which the multi-information television programming is to be displayed or received, as well as being different from the associated communication frequencies of any of the other television reception channels associated with the subscriber television receivers. However, the assigned frequencies for the related different information signals are preferably compatible television frequencies such that when mixed with an appropriate mixing frequency, as will be described in greater detail hereinafter with reference to FIGS. 3–7, they are capable of selection and conversion to the appropriate associated television reception channel frequency for the designated common television reception channel. Conventional frequency multiplexer 218, which is preferably connected to the output of multi-information television program source 216, preferably conventionally multiplexes the related different information signals to provide a multiplexed multi-information television program communication signal comprising the aforementioned multi-information packet. As used herein throughout the specification and claims the expression "multi-information packet" is meant to refer to a television compatible information segment comprising a plurality of different information message signals related in real time and content to each other, each separated by frequency from each other. It is this frequency multiplexed television compatible signal output from frequency multiplexer 218 which, along with the conventional CATV regular television programming from regular television program information source 212, is ultimately provided from CATV transmitter 214 to the subscriber distribution network 204 and therefrom to the individual subscriber television reception systems 206, 208, 210.

As was previously mentioned, the presently preferred embodiment illustrated in FIG. 1 assumes, by way of example, that the illustrative system is a ten channel television system having television channels A–J and that channel A is the designated common television reception channel over which the multi-information packets comprising the selectable multi-information television program are to be selectably displayed at the independent choice of the individual subscriber. Moreover, as previously mentioned, the presently preferred system of FIG. 1 also assumes that regular conventional cable television programming for the designated common television reception channel, channel A, is substantially simultaneously transmitted along with the multi-information packets comprising the selectable multi-information television program so as to enable the individual subscriber to independently select between reception of conventional regular television programming on the designated common television reception channel and reception of the multi-information television program on that same channel. In addition, as will be described in greater detail hereinafter, this feature of the presently preferred system of the present invention enables subscribers who do not subscribe to the multi-information television program capability of the system and/or who do not have the appropriate equipment to receive the transmitted multi-information television programming on the designated common television reception channel of their television receiver, to receive regular television programming on all television reception channels without having to sacrifice or lose effective use of a television reception channel.

With respect to the illustrated individual subscriber television reception systems 206, 208, and 210, by way of example, subscriber television reception systems 206 and 210 are illustrated as having the presently preferred associated equipment to enable selectable reception of the substantially simultaneously transmitted multi-information television program on the common designated television reception channel, channel A in the above example, while subscriber television reception system 208 is illustrated as not having this capability or equipment. Moreover, the associated equipment of the individual subscriber television reception systems 206 and 210 in the example of FIG. 1 is preferably identical in function and operation and includes a conventional RF demodulator 220, a conventional CATV multichannel controller 222, a conventional multichannel television receiver 224, and the presently preferred multi-information interface network 226 of the present invention which is to be described in greater detail hereinafter with reference to FIGS. 2–7. Accordingly, identical reference numerals are used herein with respect to components which are identical in function and operation. With respect to subscriber television reception system 208, the RF demodulator 220, the CATV multichannel controller 222 and the conventional multichannel television receiver 224 are preferably identical in function and operation with that previously described with reference to subscriber television reception systems 206 and 210, with the only exception being the absence of the presently preferred multi-information interface network 226. Moreover, as shown and preferred in FIG. 1, the presently preferred multi-information interface network 226 is preferably pluggable into the individual subscriber's television reception system between the television receiver 224 and the multichannel controller 222 so that it may readily be inserted in a conventional television subscriber's home by the subscriber without any modification to the television receiver 224 nor to the conventional multichannel controller 222 already in the home.

Referring now to FIG. 2, a typical presently preferred multi-information interface network 226 is shown. For purposes of discussion, it is assumed that the conventional CATV multichannel controller 222 properly treats the incoming CATV signal in a conventional manner to enable its reception and display on the various designated television reception channels A–J of television receiver 224 in the ten channel system of the present example. It is this conventionally treated signal which is preferably provided via path 230 to the input of the multi-information interface network 226. This television signal preferably then undergoes signal separation via conventional band pass filters 234 and 236 to separate this signal into the frequency band of signals which are associated with the designated television reception channels B-J via filter 234 and with the frequency associated with designated common television reception channel A via filter 236. Thus filter 234 passes the frequency band of signals associated with television reception channels B-J directly onto television receiver 224 via path 232 to enable conventional processing and display of the regular television programming associated with television reception channels B-J. The output of band pass filter 236, which is preferably a fixed frequency filter which preferably solely passes signals at the frequency associated with television reception channel A, is preferably provided via path 238 to one input of a two input double pole-double throw mode selection switch 240. The other input to mode selection switch 240 is preferably directly provided via path 230 from the CATV controller 222 and contains the frequency multiplexed multi-information television program, signal comprising the multi-information packets, as well as the conventional CATV programming television signals. As shown and preferred in FIG. 2, mode selection switch 240 has two positions labeled "NORMAL", given reference numeral 242, and labeled "MULTI-INFORMATION", given reference numeral 244. In addition to switch contacts 242 and 244, there is a neutral switch contact 246. Mode selection switch 240 also preferably includes a pair of ganged wiper arms 248 and 250 which comprise the double pole-double throw switch 240. Mode selection switch 240 is illustrated in the "MULTI-INFORMATION" mode or position in FIG. 2 in which instance the output of band pass filter 238 is preferably provided via wiper arm 248 to neutral contact 246 and is, thus, disconnected from the input to television receiver 224. At the same time, the signal provided via path 230 directly to the mode selection switch 240 is preferably provided, via wiper arm 250, contact 244, and path 252, to the input of a presently preferred multi-information selection controller 254, to be described in greater detail hereinafter with reference to FIGS. 3-7 and, therefrom, via path 256 to path 232 for provision along with the pass band of television signals for television reception channels B-J, to television receiver 224 where it undergoes conventional processing to enable reception and display thereof on designated common television reception channel A, while regular television programming is received and displayed on television reception channels B-J. The mode selection switch 240 is, thus preferably made available to the subscriber to enable the subscriber to select between reception of the multi-information television programming on designated television reception channel A, when switch 240 is in the position illustrated in solid lines in FIG. 2, and reception of substantially simultaneously transmitted normal or regular television programming on the same designated television reception channel A when switch 240 is in the position shown in dotted lines in FIG. 2. As shown and preferred in FIG. 2, in the dotted line position of switch 240, wiper arm 248 would be connected to "NORMAL" contact 242 and the channel A regular television programming signal output of filter 236 would be provided via path 260 to path 232 and therefrom to television receiver 224 along with the pass band television signal output of filter 234 to enable conventional reception and display thereof of regular television programming on television reception channels A-J. In this instance, wiper arm 250 would be connected to neutral contact 246 thus disconnecting the multi-information selection controller 254 from the input to television receiver 224.

Referring now to FIGS. 3-7, the presently preferred multi-information selection controller 254 shall now be described in greater detail. Initially referring to FIG. 3, multi-information selection controller 254 preferably includes a conventional frequency demultiplexer 270 which demultiplexes the frequency multiplexed signal originally provided from frequency multiplexer 218, with the conventional television programming having previously been processed into its assigned frequencies by the conventional CATV multichannel controller 222. Such demultiplexer 270 may be omitted if this function can be achieved in the CATV multichannel controller 222. This demultiplexed signal is then provided via path 272 to a multi-information signal band pass filter 274 which is preferably a conventional band pass filter which passes the frequency band of signals associated with the transmitted multi-information packets which band preferably falls within a band of frequencies outside of those assigned to television reception channels A-J in the example given. The output of the multi-information signal band pass filter 274 is preferably connected to one input of a two input conventional mixer 276 via signal path 277, whose other input is a mixing frequency signal provided via path 278 from the output of a mixing frequency synthesizer 280 to be described in greater detail hereinafter with reference to FIGS. 4-7. The output of mixer 276 is preferably provided via path 282 to a conventional fixed frequency filter 284 which is preferably identical to filter 236 and is a conventional band pass filter designed to pass only signals having the frequency of a single common television reception channel, namely the designated television reception channel, which in the example given is channel A. The output of filter 284 is preferably provided via path 256 to path 232 and therefrom to the input of the conventional multichannel television receiver 224.

The input to the mixing frequency synthesizer 280 is preferably a digital command signal, termed the "division ratio command signal input", provided via path 290 from the output of a conventional read only memory 292. Read only memory 292 preferably conventionally stores a plurality of unique division ratio digital command signals which, as will be described with reference to FIG. 4, ultimately determine the mixing frequency signal output of mixing frequency synthesizer 280 which is provided via path 278. Thus, read only memory 292 may be referred to as a "division ratio command signal generator." The input to read only memory 292 is preferably provided from a keyboard 294 which, for purposes of illustration, is shown as having four "unlabeled" keys 294a, 294b, 294c and 294d, although any desired number of keys may be provided without departing from the spirit and scope of the present invention. The particular key 294a-294d which is depressed or enabled at any given time by the individual subscriber will, in a conventional manner, determine the particular unique output of read only memory 292 which is provided via path 290 with each key 294a-294d preferably having a unique associated corresponding digital output being provided from read only memory 292 when the particular key 294a-294d is depressed or enabled by the subscriber. The layout of the keyboard 294 may be any desired layout and most preferably may include the mode selection switch 240 physically located adjacent keys 294a-294d to facilitate ease of use by the subscriber.

The mixing frequency synthesizer 280, which is shown in greater detail in FIGS. 4-7, is preferably a digital mixing frequency synthesizer of the type shown and described in U.S. Pat. Nos. 3,814,841 and 3,757,225. As shown and described in these references, the digital mixing frequency synthesizer 280 preferably includes a reference oscillator 300 whose output is provided to a conventional phase locked loop network 302 for providing the mixing frequency signal via path 278 to mixer 276. As was previously mentioned, this mixing frequency signal provided via path 278 is a signal having a frequency such that when this signal is mixed with the plurality of frequency separated different information signals contained in the multi-information packet, which signals are related in real time and content to each other, and which are provided to mixer 276 via path 277 at frequencies other than the common designated television reception channel A frequency, it results in the provision of one of the plurality of time and content related information signals via path 256, dependent on the key 294a-294d selected, at the frequency of the designated television reception channel A, the other signals being filtered out by fixed frequency filter 284. The choice of reference oscillator 300, which constitutes the precision frequency standard of the preferred system, is preferably dictated by the frequency accuracy and spectrum desired for the multi-information packet, as well as the number of different information signals which it is desired to have selectable at a given time which, in the instance of a multitrack source can be thought of in terms of the number of "tracks" of information to be provided. Most preferably, the reference oscillator 300 is a highly stable oscillator, such as a quartz crystal oscillator or, if desired, a tuning fork oscillator. The phase locked loop portion 302 of the digital mixing frequency synthesizer 280 of the type described in U.S. Pat. Nos. 3,814,841 and 3,757,225, preferably includes a conventional voltage controlled oscillator 304, such as a conventional CLAPP oscillator illustrated in FIG. 6 by way of example, which is tuned over the desired mixing frequency range by means of the phase locked loop 302. The frequency selected for the output of the voltage controlled oscillator 304 is preferably held fixed with crystal accuracy through the feedback system in the servo loop, which is a digitally variable feedback system, via feedback path 306. The digital output of the read only memory 292 provided via path 290 to digital mixing frequency synthesizer 280 is preferably a parallel bit digital signal and is preferably operatively connected to the input of a conventional digital frequency divider 310 having a variable division ratio represented by "÷N", the division ratio being varied in accordance with the division ratio command digital signal provided via path 290. Thus, each key 294a-294d corresponds to a different division ratio with the division ratio effectively being varied by varying the key 294a-294d which is selected.

Preferably, the digital frequency divider 310 is a conventional down counter such as one comprising a plurality of flip-flops. The feedback frequency output of divider 310 provided via aforementioned feedback path 306 is preferably provided as one input to a two input conventional phase detector 312 whose other input is the output of the aforementioned reference oscillator 300. Preferably, the output of the reference oscillator 300 corresponds to the required phase detector frequency, which is the frequency spacing between adjacent time and content related information signals comprising the multi-information packet signal band. As was referred to in U.S. Pat. Nos. 3,814,841 and 3,757,225, and as is also applicable herein, if desired another conventional difference frequency divider network, having a fixed division ratio, may be utilized between the reference crystal oscillator 300 and the phase detector 312 if the frequency of the reference oscillator 300 is not at the value of the desired phase detector frequency. The aforementioned phase detector 312, as was described in U.S. Pat. Nos. 3,814,841 and 3,757,225, may preferably be a digital phase detector, such as a conventional AND gate 320 (FIG. 7) whose output is proportional to the phase difference between the reference oscillator 300 signal in digital form and the feedback frequency divider signal from divider 310. As shown and preferred in FIG. 4, the output of phase detector 312 is preferably operatively connected via path 322 to the input of a conventional phase-to-D.C. voltage converter 324 which converts this phase difference output signal to a D.C. voltage which is utilized to control the frequency of the aforementioned voltage controlled oscillator 304, which preferably has a variable frequency output. As further shown and preferred in FIG. 4, the output of the phase-to-D.C. voltage converter 324 is preferably connected to the input of voltage controlled oscillator 304 through a conventional loop filter network 326 which preferably conventionally provides the proper pull-in and hold-in phase loop characteristics together with the gain control of the converter 324, to the voltage controlled oscillator 304. This D.C. voltage output is what is utilized to tune the voltage controlled oscillator 304.

Referring now to FIGS. 5 and 6, by way of example, a CLAPP type conventional voltage controlled oscillator 304, as was previously described, is shown. This oscillator 304 preferably includes a conventional field effect transistor 330 having a source electrode 332, a gate electrode 334 and a drain electrode 336. A conventional series resonant tuning circuit 338 is operatively connected to the gate electrode 334 of transistor 330 and a conventional parallel resonant tuning circuit 340 is preferably operatively connected to the drain electrode 336. A conventional varactor 342 is preferably operatively connected to tuning circuit 338 and, thus, the D.C. voltage input provided via path 327 from loop filter 326 preferably electronically varies the capacitance of varactor 342 which, thus, changes the capacitance of tuning circuit 338 thereby returning oscillator 304 so as to change the frequency of oscillation. Of course, if desired, voltage controlled oscillator 304 could be any other type of conventional voltage controlled oscillator, such as a Wien bridge oscillator, or a relaxation oscillator such as one employing a Shockley diode.

A typical phase-to-D.C. voltage converter which may be used for converter 324 is illustrated in FIG. 5, although any conventional means for conversion of the phase signal to a D.C. voltage may be utilized as long as such converter 324 preferably is of the type which provides a substantially stable D.C. voltage as a result of the conversion. The typical conventional phase-to-D.C. voltage converter illustrated in FIG. 5 includes a conventional low pass filter 350 which is operatively connected to conventional amplifier 352, with the low pass filter 350 preferably passing only the D.C. component of the input signal provided from phase detector 312 via path 322 while attenuating the high frequency components. The low pass filter 350 preferably contains sufficient sections of low pass filtering and rejection filtering at each of the undesired frequencies in the digital input signal, such as the phase detector frequency and the harmonics thereof, so as to minimize variations in the resultant D.C. voltage. The reason for the above is that variation in this voltage can lead to undesirable frequency modulation of the voltage controlled oscillator 304. The output of converter 324 is thereafter provided via path 325 to the input of the loop filter 326.

For purposes of illustration of the presently preferred interactive cable television system of the present invention, it shall be assumed that the prerecorded video/audio multi-information television program signal source 216 comprises a conventional type of multitrack device for providing audio and video information associated with each track at a unique associated frequency for the track with the information from each track being simultaneously processed at the head end 202 so as to provide a frequency multiplexed communication signal comprising the aforementioned multi-information packets. As was previously mentioned, the prerecorded multi-information packets each comprise a plurality of different information message signals related in real time and content to each other but each at a different associated frequency so as to frequency separate the simultaneously provided different information message signals. The technique of achieving such frequency separation is conventional and need not be described in greater detail hereinafter.

For purposes of completeness, the presently preferred technique of providing a typical multi-information packet of different information message signals related in real time and content to each other shall now be described. Preferably, the system 200 of the present invention coordinates the audio interactive portion of the multi-information packet for a particular program with the video information portion so as to enable provision of prerecorded composite television programming. With respect to the provision of this coordinated prerecorded video/audio information from source 216, this may be conventionally accomplished with conventional multitrack video tape such as a system employing one video information track for each audio information track, termed "non-shared video" herein, or one employing video tracks which are common or "shared" by a plurality of audio information tracks such as where two different video information tracks are "shared" by four audio information tracks, termed "shared video" herein, such as in the instance where one is concerned with a dichotomy of answers, such as right and wrong. In such an instance of "shared video", one video information track would contain the video display associated with a correct answer which, for example, would only correspond to one of the audio information tracks at a given time, whereas the other video information track would contain video information associated with an incorrect answer, which would correspond to the balance of the audio information tracks, by way of example. The processing of the video information and the audio information to provide a composite television signal at each of the designated frequencies for the multi-information packets at the head end 202, whether for "shared video" or "non-shared video", is conventional and will not be described in greater detail hereinafter. Suffice it to say that, in the system of the present invention, all of the various information messages should be related in real time and content to each other and, hence, should be prerecorded so that they may be properly synchronized to achieve the desired real time relationship. If, at a given time, it is desired to employ the aforementioned technique with respect to a dichotomy of answers, then preferably the video information portion would preferably merely be responsive to the correctness or incorrectness of the answer while the associated audio information portion in the resultant composite television signal which is displayed on the subscriber's television receiver 224 would preferably be directly related to the chosen answer, such as informing the subscriber why the choice was incorrect and what the correct choice was.

The prerecorded information of the cable television system 200 of the present invention, prior to processing to coordinate the video and audio portions into composite television signals, with each track being at a different associated frequency so as to frequency separate the different tracks and with each frequency being different from the frequency associated with the various television reception channels A-J in the above example, is preferably related in real time and content in the manner described in the previous commonly owned patents of Michael J. Freeman, one of the named inventors herein, namely U.S. Pat. Nos. 3,947,972 and 4,078,316, both of which are directed to a real time interactive device as opposed to an interactive cable television system of the type described herein. Suffice it to say that, preferably, whatever type of multitrack storage device is employed, it should preferably contain one track for each of the corresponding plurality of related different information message signals which are to be simultaneously transmitted. Although the system is being described in terms of only four such tracks of time related different information message signals, the system 200 is capable of operation with any number of such simultaneously transmitted different information message signals, solely being dependent on the desired bandwidth to be assigned to the frequency multiplexed multi-information packets and the desired frequency spacing within the packet as well as, of course, the unassigned frequencies which are available to be transmitted. Thus, as described in the aforementioned referenced patents of Michael J. Freeman, a conventional multitrack playback head could be conventionally employed with the multitrack storage medium for conventionally simultaneously reading or playing back all of the tracks from the storage medium in order to simultaneously provide this information for processing, including subsequent frequency separation of each of the tracks, subsequent frequency multiplexing of the multi-information packet and ultimate transmission thereof to the CATV subscriber distribution network 204. It should be noted that at any given time any of the tracks, each of which preferably has a corresponding associated key 294a-294d in the above track or four simultaneously transmitted information message signal example, can be termed the question or interrogatory key or track, as will be described in greater detail hereinafter, because of the nature of the information message transmitted at a given point in time from that track or, thus, selectable by that corresponding key 294a-294d. However, of course, this can be varied on a packet-by-packet or information message-by-message or segment-by-segment basis so that the particular key 294a-294d and associated information message signal can be changed in accordance with the prerecorded information provided from the head end 202. In this regard, it should be noted that the keyboard 294 is not restricted by any "labeling" associated with the keys and, thus, as will be described in greater detail with reference to FIGS. 12-14, the "labels" associated with the keys 294a-294d may be dynamically varied to provide relatively unlimited flexibility to the system 200. With respect to the prerecorded information at multi-information television program source 216, this information is preferably stored in a plurality of reproducible information segments or packets, each of which preferably comprises a complete video/audio information message, whether it is produced from an equal number of video tracks and audio tracks in the instance of "non-shared video" or less video tracks than audio tracks in the instance of "shared video" in the example of a dichotomized presentation, with each of these complete messages being reproducible upon playback by the conventional multitrack playback head or means associated with playing back of this information prior to processing. Of course, any conventional playback means other than a multi-track playback head, such as a plurality of separate playback heads, may be employed. The manner of provision of the reproducible information segments or packets as a plurality of different information signals related in real time and content to each other is similar to the manner of operation described in the aforementioned U.S. Pat. Nos. 3,947,972 and 4,078,972 and 4,078,316, prior to the employment of the aforementioned frequency separation and multiplexing of the system 200 of the present invention.

By way of example, the plurality of different information message signals which are related in real time and content to each other could comprise an interrogatory message associated with a given track or key 294a-294d and simultaneously provided various types of responsive messages, associated with the balance of the keys 294a-294d, with the responsive messages and the interrogatory messages being preferably related in real time and content to one another in a conversational real time environment so as to provide a two-way interactive effect in what is, in reality, a one-way cable television system. In addition, such an arrangement would provide an enhanced educational value for members of the mass audience serviced by distribution network 204. In such a presentation, the particular key 294a-294d which at a given time corresponds to the interrogatory message of that particular time related segment of the multi-information packet may also contain additional instructional information. Thus, for a particular real time related interrogatory message, the other time related information message signals whose content, by way of example, are the incorrect responsive messages for the particular interrogatory message content of one of the plurality of simultaneously transmitted information message signals may preferably contain instructional messages corresponding to selection of an incorrect responsive message which are related in real time and content to the particular interrogatory message in that particular segment of the multi-information packet. If desired the so-called selective responsive messages, which correspond to the balance of the keys 294a-294d, for a given interrogatory information message or signal of the multi-information packet segment may also initially contain a responsive multiple choice message further indicating that if the individual subscriber wishes to learn more about the topic of the question asked, then the subscriber should depress or enable a particular key 294a-294d on keyboard 294 which will result in the frequency selection and display of the information message signal containing the additional information in the manner previously described. In such an instance, when the subscriber activates that particular key on keyboard 294, a predetermined length segment of additional information relating to the topic would be received on television reception channel A. If this or another subscriber, however, did not want such additional information to be received on channel A, then the next interrogatory message, either associated with the same key as for the previous interrogatory message or with a different key other than the one which for that particular instant was associated with the additional information selection, would be substantially simultaneously provided or transmitted with the subscriber then preferably being confined to selection of an answer or responsive message associated with the remaining keys on keyboard 294 for that particular multi-information packet segment, with the extent in time of this subsequent interrogatory message preferably being equivalent to the extent in time of the additional information provided contemporaneously during that multi-information packet segment. Thus, as previously mentioned, the various information segments stored on the prerecorded multi-information television program source 216 and provided therefrom so as to be simultaneously transmitted in multi-information packet segments are set up so as to be time related with plurality of different information message signals in a given multi-information packet segment, as previously mentioned, preferably being related to each other not only in real time but in content as well, and with the transmitted multi-information packet segment further having each of the related different information message signals being separated from each other by frequency. The time relationship allows an individual controllable and educational experience for each subscriber in the mass audience and, moreover, as will be described in greater detail hereinafter with respect to the memory accumulation and label changing features of the system of the present invention, enables specific information messages, such as advertisements or educational material, to be tailored simultaneously to different specific audiences. Thus, the system of the present invention, although being similar in certain aspects to the aforementioned U.S. Pat. Nos. 4,078,316 and 3,947,972 with respect to the desired relationship in real time and content of the respective different information messages, is vastly different from these systems, particularly in the relatively unlimited flexibility of the system 200 of the present invention with respect to both capacity of the system and content. Moreover, in the instance of the presently preferred embodiment of the system 200 illustrated in FIG. 1, there is a further difference in that the plurality of different information message signals which are related in real time and content in the multi-information packet are simultaneously transmitted for selection and display over a common television channel without any modification to the actual convention multichannel television receiver 224 and, if desired, may be provided to one subscriber while another subscriber receives regular programming on that same channel.

For purposes of illustration, and assuming that corresponding video information is being simultaneously displayed, if desired, with the audio information portion, a sample information content of a typical multi-information packet segment is provided below with the assumption that the transmission selection is among four keys 294a-294d. For purposes of illustration in the example given below, the information labeled Q corresponds to key 294a for this multi-information packet segment, the information content labeled T, Y, A corresponds to key 294b, the information segment labeled F, N, B corresponds to key 294c, and the information segment labeled MORE, C corresponds to key 294d.

SAMPLE CONTEMPORANEOUS INTERACTIVE PROGRAM TRANSMISSION FORMAT

| | |
|---|---|
| Q | much . . . . This is a true/false question. Columbus discovered America in 1520. Answer true or false now . . . . |
| T Y A | you another question . . . . This is a true/false question. Columbus discovered America in 1520. Answer true or false now . . . . |
| F N B | you another question . . . . This is a true/false question. Columbus discovered America in 1520. Answer true or false now . . . . |
| MORE C | enables a person to determine direction. Since there are large magnetic deposits at the north pole, a magnetic compass will point to the |
| Q | You have not chosen. It is too late . . . . Keep waiting . . . . . . . . Here is your next question etc. etc. |
| T Y A | ,Not correct. Columbus discovered America in 1492. You chose the wrong answer . . . . Here is your next question etc. etc. |
| F N B | ,Correct, Correct. Columbus discovered America in 1492 as you probably know. Good work . . . . Here is your next question etc. etc. |
| MORE C | north pole from anywhere on earth. This can help a traveler find his way . . . . Here is your next question etc. etc. |
| Q | Where does the word news come from? I will give you three choices; A the Greek word for nap, snooze; B the points on a compass, or C nobody knows. |
| Y A | Where does the word news come from? I will give you three choices; A the Greek word for nap, snooze; B the points on a compass, or C nobody knows. |
| N B | Where does the word news come from? I will give you three choices; A the Greek word for nap, snooze; B the points on a compass, or C nobody knows. |
| MORE C | Where does the word news come from? I will give you three choices; A the Greek word for nap, snooze; B the points on a compass, or C nobody knows. |
| Q | Choose A, B, or C now . . . . you chose no answer. You are a big dummy. Just wait and I will ask you another question . . . . I know you are still |
| Y A | Choose A, B, or C now . . . . you chose A and you are not correct. The word news comes from the points of a compass N, north; E, east; W west; and |
| N B | Choose A, B, or C now . . . . you chose B and you are correct. N, north; E, east; W, west, and S, south. You are correct and a very smart child. |
| MORE C | Choose A, B, or C now . . . . you chose C and you are not correct. The word news comes from the points on a compass N, north; E, east; W, west; and |
| Q | waiting but you should have chosen an answer . . . . To learn about a compass, push MORE button . . . . I can see you don't like to push buttons |

SAMPLE CONTEMPORANEOUS INTERACTIVE PROGRAM TRANSMISSION FORMAT
-continued

| | |
|---|---|
| T Y A | S, south. If you would like to learn more about the compass push the "MORE" button now . . . . Since you have not selected "MORE" I will ask |
| F N B | If you would like to learn more about the compass push the "MORE" information button now . . . . Since you have not selected "MORE" I will ask |
| MORE C | S, south. If you would like to learn more about the compass push the "MORE" button now . . . . Thank you. A compass is a device that |

In the example given above, it should be noted that the information message signals associated with each of the keys 294a-294d in the particular multi-information packet segment are preferably continuously provided, during program transmission, with blank spaces being provided at appropriate real time related intervals in the prerecorded information, and correspondingly in the transmission, for the appropriate separated information message signals so as to relate the plurality of different information message signals provided in the given multi-information packet segment in real time and content. Of course, if desired, the program transmission may contain interruptions so as to allow the subscriber time to perform additional work at home, such as computations.

The above is just an example of one type of information content which may be transmitted with the various types of information being unlimited, such as game programs which allow interaction with the subscriber at home enabling the individual subscribers to individually compete in games of skill and chance, and automatic scoring such as through the use of prerecorded scoring signals associated with each different information message signal and a conventional sensor in the multi-information selection controller 254 which will sense the key selected at a given time and thereby accumulate the score by detecting the transmitted scoring code. Thus, the entertainment value of the presently preferred system 200 of the present invention is potentially very vast, primarily due to its flexibility.

Figure 13A:
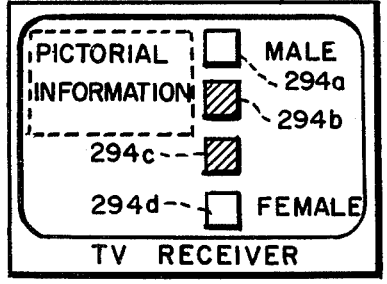
FIGS. 13A-13D are diagrammatic illustrations of typical subscriber television presentations in accordance with the decision tree of FIG. 12, further illustrative of the dynamic label changing function of the system of the present invention.
Figure 13B:
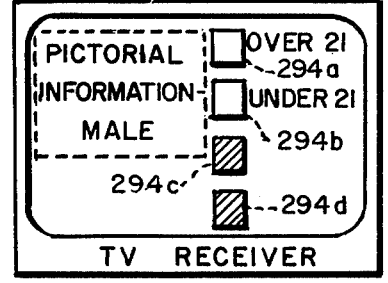
Figure 13C:
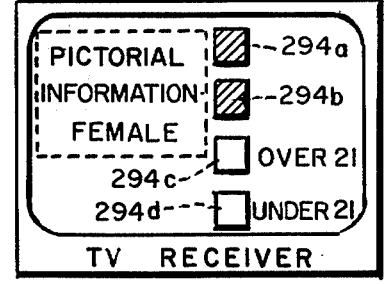
Figure 13D:

An example of such flexibility is the memory accumulation and label changing features which are illustrated with reference to FIGS. 12 and 13A-13D, by way of example. With respect to FIG. 12, a logic decision tree is illustrated a sequence of multi-information packet segments in which the sex of the subscriber is individually determined, thereafter the age group of the subscriber is individually determined, and finally a particular tailored information message for the subscriber in that sex group and that age group is presented, thus enabling tailored advertising messages as well as tailored educational messages to be substantially simultaneously presented on an individual basis to each subscriber. This technique is preferably termed "memory accumulation". Thus, in the following example, the subscriber is first asked: "are you a male or female, look at the screen and answer appropriately". FIG. 13A illustrates a typical video presentation corresponding to this audio message. The presentation in FIG. 13A, in the example given, illustrates a visual display of the keys 294a-294d with 294b and 294c being blackened out so as to indicate to the subscriber that these keys are not to be employed at this time, and with keys 294a and 294d being highlighted and "labeled" on the screen as male and female, respectively. If the subscriber is a male, he should then depress key 294a. He will then hear: "thank you sir; now look at the screen and push the key that corresponds to your age group". For purposes of illustration, the age groups have been defined as "over 21" or "under 21", although it may be segmented in any manner desired. FIG. 13B illustrates a typical video presentation corresponding to this question. Again, the keys which are not to be employed at this time are blackened out, with these keys in FIG. 13B by way of example, corresponding to keys 294c and 294d. The subscriber then should depress either key 294a or 294b, depending on his age grouping, and the next information which he receives is a tailored information message directed to him either as a male over 21 or as a male under 21, with the audio portion, if desired, containing an introductory message stating that: "I now know you are a male over 21, [or under 21], here is a special question [or message] specifically for you". In addition, in place of or in addition to this message an advertisement specifically tailored for that sex and age group may be presented enabling an advertiser to gear commercials to segmented audiences for maximum exposure and results. In addition, different types of video or audio messages could then be provided depending on whether it was a male or female audience or different age audience and the difficulty and content of the questions could also be varied dependent on sex and age grouping. Assuming the subscriber is a male, then the presentations represented by FIGS. 13A and 13B would have appeared on the screen of the subscriber's television receiver 224. Assuming, however, that another subscriber is a female, then the visual presentations represented by FIGS. 13A and 13C would have appeared, by way of example, on the screen of that subscriber's television receiver 224a, in accordance with appropriate selection, at the same time that the previously mentioned presentations were appearing on the screen of the responding male subscriber. Thus, the above illustrates but one of the many flexibilities of the system in terms of label changing and segmenting of audience so as to provide individualized messages or television reception to each of the subscribers in the subscriber distribution network who utilize the multi-information interface network 226 of the present invention. FIG. 13D is merely illustrative of the ultimate tailored display. In addition to the above, as previously described with reference to subscriber television reception system 208, while individual subscribers are receiving television programming information specifically tailored to them in the manner described above, subscribers who do not have the presently preferred multi-information interface network 226 of the present invention, or who do not wish to receive this tailored information, for example, may receive regular programming on the designated television reception channel A.

Figure 14:
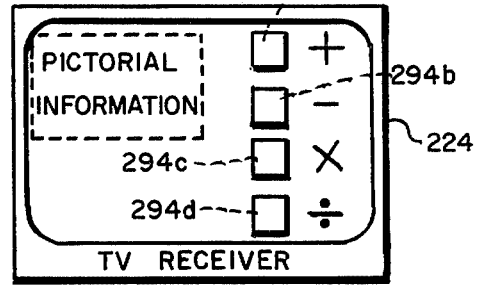
FIG. 14 is a diagrammatic illustration, similar to FIGS. 13A-13D, further illustrative of the dynamic label changing function of the system of the present invention in accordance with a talking calculator function of the system of the present invention.

Referring now to FIG. 14, another example of the flexibility of the system 200 of the present invention is illustrated. The example shown in FIG. 14 is for a talking calculator, again illustrating the dynamic label changing flexibility of the system. In such an instance, the keys 294a–294d may be "labeled" with mathematical symbols "+", "−", "x" and "÷", respectively, in the video display provided on the screen on the conventional television receiver 224 with, if desired, accompanying pictorial information. In such an instance, the audio message provided to the subscriber, by way of example, could be "18 and 3, choose your function". In such an instance, if the subscriber depresses key 294a, the subscriber will hear the answer "twenty-one" which may also be displayed on the screen in any manner desired. Similarly, if the subscriber depresses key 294b, the subscriber will hear the answer "fifteen" with an accompanying video display if desired; if the subscriber depresses key 294c, the subscriber will hear "fifty four" with an appropriate video display if desired; and if the subscriber depresses key 294d, the subscriber will hear "six" with an appropriate video display if desired. Similarly, the function labels can be dynamically changed in the video display with the transmitted answers correspondingly being changed in real time.

Thus, the presently preferred system 200 of the present invention enables instant label changes to dynamically occur which significantly enhances the flexibility of the system 200, such as enabling meaningful memory accumulation to occur. In addition, the coordinated audio and visual information provided in this system provides enhanced effects such as video display of pages in books, diagrams and symbols which could be directly associated with the keys 294–294d to be selected or, if desired, at any given time, a key 294a–294d could be directly associated with an event such as by visually depicting arrows drawn from the respective key choices displayed on the screen to various points in a maze with the subscriber being asked to select which point in the maze the subscriber expects a moving figure to exit from. Moreover, the keys can be visually labeled in any manner which dynamically changes, such as by providing pictures instead of words next to the keys, or by providing whatever is desired by the creator of the programming provided from the head end 202.

In addition to the above exemplary functions, other illustrations of the potential flexibility available in the system of the present invention are in performance of the type of functions described in detail in the aforementioned U.S. Pat. Nos. 4,078,316 and 3,947,972. In this regard, by way of example, story programs may be provided which enable the subscriber to actually have a part on an individualized basis in formulating the story and helping to dynamically determine its outcome. This is accomplished by transmitting information which has been prerecorded and stored in such a manner so as to enable branching back and forth between the various tracks or time related information signals so as to provide an interactive story which is preferably stored and transmitted in spatial relationship between the various time related information signals and/or tracks so that the subscriber can choose options that formulate a story line with these options being related to different scenarios. For example, by using such an option approximately ten times during a thirty minute story presentation, hundreds of different ways in which the story can evolve occur. An example of such a story program is illustrated below. For purposes of illustration, the following key designation, in the example below, is associated with the various different information signals, with the label Q corresponding to key 294a, with the label B corresponding to key 294c, with the label A corresponding to key 294b and with the label C corresponding to key 294d.

| STORY FORMULATION PROGRAM TRANSMISSION EXAMPLE | |
|---|---|
| Q | Superman is after some criminals but Superman is in big trouble. The Kryptonite is about to make him powerless. What should |

STORY FORMULATION PROGRAM TRANSMISSION EXAMPLE

|   |   |
|---|---|
|   | Superman do. A, run. B, call Batman. Or C, continue even with the danger. Please answer NOW.... |
| B | Superman is after some criminals but Superman is in big trouble. The Kryptonite is about to make him powerless. What should Superman do. A, run. B, call Batman. Or C, continue even with the danger. Please answer NOW.... |
| A | Superman is after some criminals but Superman is in big trouble. The Kryptonite is about to make him powerless. What should Superman do. A, run. B, call Batman. Or C, continue even with the danger. Please answer NOW.... |
| C | Superman is after some criminals but Superman is in big trouble. The Kryptonite is about to make him powerless. What should Superman do. A, run. B, call Batman. Or C, continue even with the danger. Please answer NOW.... |
| Q | ...... |
| B | ...... |
| A | ...... |
| C | ...... |
| Q | Since you have not chosen, I will choose 'A' for you. Superman runs away since he could die from the Kryptonite. Although he leaves quickly, the Kryptonite still has had a bad effect on Superman. He has headaches and feels weak. What should he do. A, nothing. B, go to a hospital where they find out he is really Clark Kent. Or C, admit who he is and get Lois Lane to help. Please choose your answer NOW.... |
| B | So as you suggest, Superman calls Batman. Batman comes but is unable, on his own, to fight the criminals. So both of them fight but Superman is affected by the present Kryptonite. After the fight Superman faints and Batman does not know what to do. He needs your help. Should Batman A, just hope Superman recovers. B, go to a hospital where they are bound to find out he is Clark Kent. Or C, call Lois Lane for advice. Choose your answer NOW.... |
| A | So as you suggest, Superman runs away since he could die from the Kryptonite. Although he leaves quickly, the Kryptonite still has had a bad effect on Superman. He has headaches and feels weak. What should he do. A, nothing. B, go to a hospital where they may find out he is really Clark Kent. Or C, admit who he is and get Lois Lane to help. Please choose your answer NOW.... |
| C | So Superman, being a brave fighter of criminals risks his own life to fight them. Of course Superman wins, but the Kryptonite has made him very blind and Superman blames you since you decided this for him. What are you going to do to help him now. Should Superman A, continue as a blind man and be careful as he flies. B, go get medical help where he will have to admit he is Clark Kent. Or C, call Lois Lane for assistance. Please choose NOW.... |
| Q | ...... |
| B | ...... |
| A | ...... |
| C | ...... |
| Q | I will choose for you. So Superman does nothing and hopes his condition is temporary. He must be very careful now because anyone seeing his condition and Clark Kent might realize that they are one in the same. |
| B | So Superman goes to a hospital for medical help. Luckily, the doctors and nurses are very busy and Superman is able to change into regular clothes before anyone sees him. When he is examined, nobody is suspicious that this may be Superman. |
| A | So Superman does nothing and hopes his condition is temporary. He must be very careful now because anyone seeing his condition and Clark Kent might realize that they are one in the same. |
| C | So Lois Lane gets involved and becomes very suspicious of what is going on here. Although Superman is afraid he will have to admit who he really is, it turns out that Lois Lane must leave on an important assignment from Perry White. Superman is relieved and never does Lois find out the truth. |
| Q | The next day, Superman is supposed to attend the opening of a new police headquarters in Metropolis. Do you think he should attend. Please answer yes or no NOW.... |
| B | The next day, Superman is supposed to attend the opening of a new police headquarters in Metropolis. Do you think he should attend. Please answer yes or no NOW.... |
| A | The next day, Superman is supposed to attend the opening of a new police headquarters in Metropolis. Do you think he should attend. Please answer yes or no NOW.... |
| C | The next day, Superman is supposed to attend the opening of a new police headquarters in Metropolis. Do you think he should attend. Please answer yes or no NOW.... |
| Q | Since you have not decided Superman has decided to go. So in his disabled condition Superman attends the opening of the new police headquarters. |
| B | You are mixed up. You can't help Superman if you cannot even follow instructions. In any case Superman has decided to go and attends the opening of the new police headquarters in his disabled condition. |
| A | So in his disabled condition Superman takes your advice and attends the opening of the new police headquarters. |
| C | So in his disabled condition Superman takes your advice and does not attend the opening of the new police headquarters. |

As will be readily apparent, the above story information formulation approach will enable individual subscribers in a subscriber distribution network to individually interact with and form there own story which, depending on the choice provided, would preferably have accompanying video presentation such as a cartoon or actual film footage depicting the event selected so that the audio and visual presentation would create an individualized story for each subscriber participating in that activity.

Figure 11:
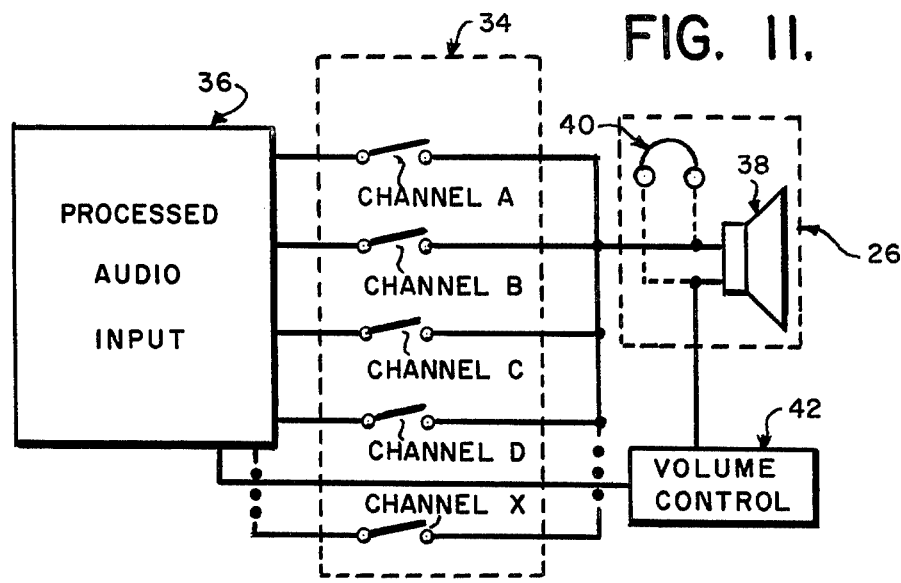
FIG. 11 is a diagrammatic illustration, partially in block, of the audio selection portion of a typical conventional multichannel TV receiver in accordance with the embodiment of FIG. 10.
Figure 12:
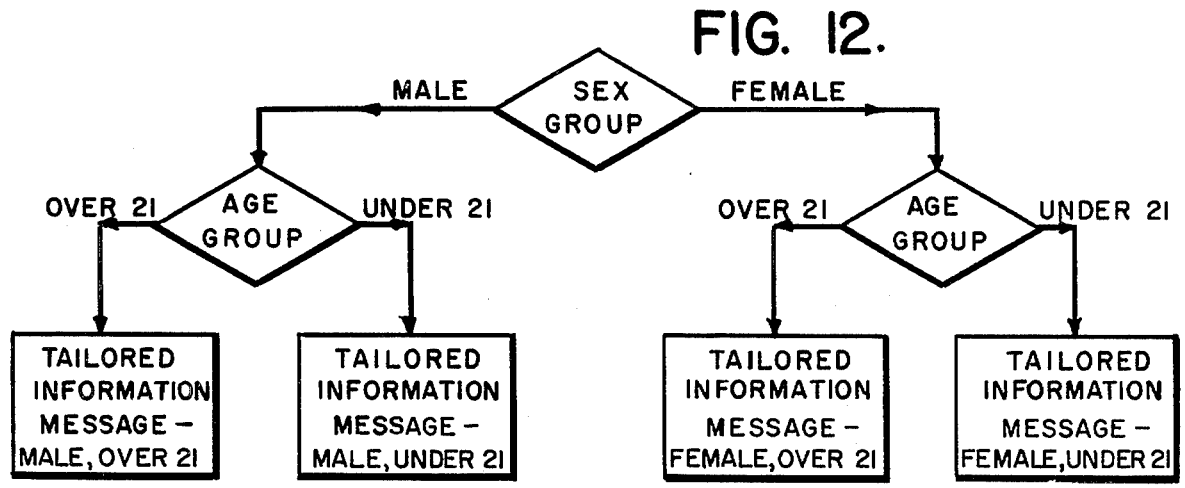
FIG. 12 is a logic flow diagram illustrative of a decision tree in accordance with the memory accumulation function of the system of the present invention.

Referring now to FIGS. 8 and 9, alternative embodiments are illustrated for the individual subscriber television reception systems 206′, 206″ of the system of the present inventors which are usable in situations where regular programming information for the designated channel, such as channel A, is not transmitted from the head end 202 at the time that the multi-information packets are transmitted. In such an instance, those subscribers who did not have the multi-information selection controller 254 would not receive any information on the designated channel A during the transmission of the multi-information programming. Moreover, the entire multi-information interface network 226 previously described with reference to FIG. 2, would not be needed and merely the multi-information selector controller 254 could be employed and connected in parallel with the conventional CATV multichannel controller 222 if one is needed or, as illustrated in FIG. 9, if no such controller 222 is needed by the subscriber, then the multi-information selection controller 254 could be connected in parallel with the normal input to the television receiver 224. The arrangement illustrated in FIGS. 10 and 11 is an alternative embodiment of the presently preferred system 200 of the present invention in which the prerecorded video/audio multi-information is individually transmitted on a channel-by-channel basis with one track being dedicated, or associated, with each channel. This, of course, requires that a plurality of channels equal in number to the number of selectable tracks be dedicated to the multi-information selection program transmission which, although simpler to implement than the presently preferred system 200 of the present invention, is not as efficient and, moreover, will put additional usage demands on the tuner or channel selector of the television receiver 224 in order to switch back and forth between channels during the presentation of the multi-information program which may be undesirable in some instances. However, one of the primary benefits of the system of FIGS. 10 and 11 is that it essentially requires no additional equipment to be put in the home of the subscriber, whereas the presently preferred system 200 of the present invention requires the addition of a special multi-information interface network 226 or, at the very least, the addition of a special multi-information selection controller 254. The preferred method of the present invention illustrated in FIGS. 10 and 11 may preferably be employed for providing an individually controllable real time interactive conversational type response from a plurality of multichannel audio information signal receivers, such as illustratively represented by conventional subscriber television reception systems or stations 12 and 14 in FIG. 10, over a common subscriber distribution network 16. With respect to the following description, it should be noted that conventional multichannel TV receivers 22 and 24 in FIG. 10 correspond to television receiver 24 in FIG. 1 and RF demodulators 18 and 20 correspond to RF demodulator 220 in FIG. 1.

With respect to the subscriber television reception systems or stations 12 and 14 in such an illustrative CATV subscriber distribution network 16, the subscriber stations preferably comprise a conventional RF modulator 18 and 20, respectively, and conventional multichannel TV or television receivers 22 and 24, respectively, which each conventionally provide an audio output and a corresponding video display as illustratively, diagrammatically represented in FIG. 10 by blocks 26 and 28 for subscriber station 12 and blocks 30 and 32, respectively, for subscriber station 14. FIG. 11 diagrammatically illustrates the significant portions of a typical conventional multichannel TV receiver 22 but is not meant in any way to be a true representation of the associated conventional circuitry accomplishing the functions illustrated in FIG. 11. Thus, FIG. 11 represents the channel selector function 34 of the conventional multichannel TV receiver 22, with only channels A, B, C and D and X being specifically represented by way of example, although such conventional multichannel TV receivers 22 have considerably more channels particularly when employed in conjunction with a CATV television system; the block labeled "processed audio input" and given reference numeral 36 represents the function of the conventional TV receiver 22 circuitry which processes the incoming audio signal in order to provide an audio output which is represented by block 26, graphically illustrating a conventional speaker 38 and optional headphones 40; and a conventional volume control function 42 for conventionally controlling the volume of the audio output 26.

Now referring again to FIG. 11, a plurality of separate contemporaneous complete audio/video information messages are simultaneously transmitted over a plurality of contemporaneous channels, such as the illustrated channels A, B, C and D, to the aforementioned plurality of multichannel television receivers 12, 14 through the common subscriber distribution network 16, with each of the plurality of channels A, B, C, D simultaneously containing the contemporaneous audio/video information messages thereon such as previously described with reference to FIG. 1. As illustrated by FIG. 11, one manner of accomplishing this may be by employing a multitrack storage device 50 of the type described in U.S. Pat. No. 3,947,972 or 4,078,316. The multitrack storage device 50 illustrated in FIG. 11 is shown as being the type employed in the aforementioned U.S. Pat. No. 4,078,316. Thus, the contents of U.S. Pat. No. 4,078,316 as they relate to the operation of such a multitrack storage device 50 are preferably hereby specifically incorporated by reference in their entirety; however, for purposes of completeness the appropriate portions will be reiterated herein. Suffice it to say at this time, that the multitrack device 50 preferably contains one track for each of the corresponding assigned channels to be simultaneously transmitted, with these tracks being labeled track A, track B, track C, and track D corresponding to channels A, B, C and D, respectively. A separate conventional audio amplifier 52, 54, 56, 58, respectively, is preferably provided for each of the channels A, B, C, and D, with the respective outputs of these audio amplifiers 52 through 58, being conventional and being conventionally provided to the conventional television transmitter circuitry for each of the channels A through D, diagrammatically illustrated by blocks 60, 62, 64, and 66, respectively, in FIG. 10. Since the illustrated system in FIG. 10 is a CATV television distribution system, the outputs of the respective conventional channel transmitters 60 through 66 are respectively provided to conventional CATV RF modulators 68, 70, 72 and 74, respectively, to provide the conventional channel A, channel B, channel C and channel D television signals which comprise at least the aforementioned audio information messages and which may also comprise corresponding video information, if desired to provide subscriber selectable multi-information television programming.

As previously mentioned, only four such interactive type channels are illustrated, although the conventional CATV distribution system may simultaneously provide several additional channels of regular CATV television programming such as illustratively represented by the block labeled "channel X TV transmitter" given reference numeral 76 and its associated conventional CATV RF modulator 78, with channel X also being diagrammatically illustrated in FIG. 11 as being part of the conventional channel selector function 34. Thus, not only can regular television programming be transmitted at the same time as the multi-information television programming the contemporaneous audio and/or video information messages being provided on channels A through D but, when such audio information messages are not provided on channels A through D, these channels can also carry regular television programming with this feature being diagrammatically illustrated in FIG. 10 by switches 80, 82, 84 and 86 connected to the outputs of the audio amplifiers 52, 54, 56 and 58, respectively, with these switches 80 through 86, respectively, being in the closed position in FIG. 10.

Thus, the multitrack storage device 50 illustrated in FIG. 10 conventionally employs a magnetic storage medium, such as a multitrack magnetic tape 88, which may be driven by a conventional capstan drive such as provided via a conventional pressure roller 90 and conventional capstan 92 which are driven by a conventional motor drive 94 so as to provide the aforementioned conventional capstan drive of the multitrack magnetic tape 88. A conventional multitrack magnetic playback head 96 is conventionally employed with multitrack magnetic tape 88 for preferably conventionally simultaneously reading or playing back all of the tracks A through D of the tape 88 in order to simultaneously play back the audio information stored on these tracks A through D and conventionally provide them to the audio amplifiers 52, 54, 56 and 58, respectively, corresponding to tracks A, B, C, and D, respectively. For purposes of illustration, track D is termed the question or interrogatory track, as will be described in greater detail hereinafter, because of the nature of the information stored thereon. Although the lowermost track, track D, is illustratively shown as the question track, any of the tracks A through D could be designated as the question track if desired. Moreover, as will further be described in greater detail hereinafter, the information is preferably stored on the tracks of the magnetic tape 88 in a plurality of reproducible information segments or packets, each of which preferably comprises a complete audio and/or video information message which is reproducible upon playback by the conventional multitrack playback head 96. It should be noted that, of course, separate playback heads could be employed for each of the tracks A through D as opposed to a single multitrack playback head 96. The extent of the aforementioned reproducible information segments are illustratively represented in FIG. 10 by the spacing between a pair of solid vertical lines on a given track, with it being assumed that audio information messages are provided from playback head 96.

The aforementioned audio amplifiers 52, 54, 56, and 58 conventionally playback the information stored on the respective audio tracks A through D which is simultaneously read out or placed back by playback head 96 and subsequently provide these outputs to the aforementioned respective television transmitters 60, 62, 64 and 66, with switches 80, 82, 84 and 86 being in the closed position, at the television studio or head end represented by reference numeral 100. As will be described in greater detail hereinafter, the individually controllable selection of the particular track A through D to be heard is accomplished in conventional fashion by a subscriber or member of the mass audience serviced by the CATV subscriber distribution network 16 by means of the conventional channel selector 34 employed with the conventional multichannel TV receiver 22, 24 in the same manner as regular programming is selected. Moreover, as previously mentioned, the above may preferably be employed, by way of example, in addition to conventional regular programming to supplement it and may share the same channels used for regular programming, with regular programming being simultaneously available on other channels or, if desired, certain channels may be dedicated to this type of interactive conversational type programming or multi-information programming while others provide regular programming. With respect to the conventional channel selector 34, in the example shown, channel D corresponds to the question or interrogatory track, with channel positions A, B and C, respectively, corresponding to the tracks A, B, and C, respectively, on the magnetic tape 88. As previously mentioned with reference to the embodiment of FIG. 1, "labels" for each of the channels may be visually displayed on the television screen, and dynamically changed, so as to effectively convert each of the channel positions for channels A through D into multipurpose or function positions such as by "labeling" the channel A position as "A", "yes", and "true"; by "labeling" the channel B position as "B", "false", and "no"; by "labeling" the channel C position as "C" and "more"; and by "labeling" the channel D position as "question".

In addition, as illustratively shown in FIG. 10, the multitrack storage device 50 may be conventionally powered by a conventional power supply 104, such as either a DC power supply or an AC power supply, depending on the desired operating conditions, for supplying power to enable the operation of the motor 32 and, if desired, the audio amplifiers 52, 54, 56 and 58, with a conventional on/off switch 106 being provided for the motor 94 which drives the magnetic storage device 50. As previously mentioned, when switch 106 is closed along with switches 80, 82, 84 and 86, the output of the corresponding audio tracks A, B, C and D are preferably provided to the audio amplifiers 52 through 58, inclusive, and therefrom to the conventional TV transmitters 60 through 66, inclusive, associated with these channel and out onto the air over the CATV subscriber distribution network 16 to the various subscriber stations 12, 14 along with regular television programming, such as provided via transmitter 76, for individually controllable selection by any subscriber in the mass audience via his/her channel selector 34. With respect to the aforementioned visually displayed labels, it may preferably comprise any label arrangement for the associated channels employed on channel selector 34 in connection with the programming of designated conversational type interaction such as the aforementioned configuration or, for example, if the information to be transmitted in this program format, such as from multitrack storage device 50, is to be a mathematical information program format then channel A could be "labeled" "A", "greater than", "true"; channel B could be "labeled" "B", "less than", "false"; channel C could be "labeled" "C", "equal to"; and channel D could again be "labeled" "question", although any other desired label configuration could also be provided dependent on the information to be transmitted in the multi-information television programming interactive conversational type program format.

If desired, of course, the magnetic tape 88 may contain the sophisticated format employed in U.S. Pat. No 3,947,972, the contents of which are also hereby specifically incorporated by reference in their entirety, or the more simplified format described in U.S. Pat. No. 4,078,316, the contents of which were previously specifically incorporated by reference herein in their entirety. Assuming the simplified format of the aforementioned U.S. Pat. No. 4,078,316 is employed, then the magnetic tape 88 would contain a single primary question or interrogatory message track, track D, with the other three remaining tracks in the example given, tracks A, B, and C, all simultaneously preferably containing the same question at the same time and thereafter containing various types of responsive messages, with the responsive messages and the interrogatory messages being preferably related in real time and content to one another in a conversational real time environment so as to provide an enhanced educational value for members of the mass audience serviced by the distribution network 16, while the other three tracks A through C, corresponding to channels A through C, contain responsive messages to the question, the primary question track, track D, corresponding to channel D, preferably contains additional instructional information. Thus, for a particular real time related interrogatory message contained on the question track, such as track D, and correspondingly transmitted over channel D, the tracks containing the incorrect responsive messages for the particular interrogatory message may preferably contain instructional messages corresponding to selection of an incorrect responsive message which are related in real time and content to the particular interrogatory message contained on track D and transmitted over channel D or may also contain additional information, labeled "more", on a given topic. For example, each of the responsive tracks, A through C, which are correspondingly transmitted via channels A through C, respectively, can initially contain a responsive multiple choice message further indicating that if the individual subscriber wishes to learn more about the topic of the question asked then he/she should switch to channel C. In such an instance, when the subscriber switched to channel C, a predetermined length segment of additional information relating to the topic would be heard. If this or another subscriber, however, did not want additional information, then the next interrogatory message on track D provided via channel D would be confined to selection of an answer or responsive message contained on tracks A and B provided via channels A and B, respectively, whose extent in time would be equivalent to the extent in time of the additional information contained on track C provided contemporaneously via channel C. Thus, as previously mentioned, the various information segments on tape 88, and correspondingly the various contemporaneous audio information message transmissions via channels A through D are set up as to be time related. Moreover, this time relationship allows a multiple use of the type previously described herein of each of the channels or tracks and enables the aforementioned individual controllable and different educational experience for each subscriber in the mass audience. For example, as mentioned above, in the instance where more information is to be provided to an individual subscriber, then the next question on track D or correspondingly channel D could be confined to a yes/no or a true/false question if desired. Preferably, as previously mentioned, although track D or channel D is essentially the question track or channel, in the example given, all of the tracks or channels simultaneously contain the question prior to selection of a responsive message thereto with the exception that when the more information condition is present, that track, track C or channel C by way of example, does not contain the question being asked on the other tracks or channels while "more" information is provided. This function is different from the system described by way of example in U.S. Pat. No. 3,947,972, where one track and one track only was exclusively a question or interrogatory message track.

In the examples given above with respect to the embodiment of FIG. 1, and which would also apply hereto, it should be noted that, as applied hereto, the information transmitted on each of the channels A through D is preferably continuously provided, during program transmission, such as being continuous on the tape 88, with blank spaces being provided at appropriate real time related intervals on the tape 88, and correspondingly in the transmission, for the appropriate channels so as to relate the information provided on the various channels A through D in real time and content, such time relation being illustratively shown in the above examples by the illustrative alignment of the information illustrated above.

Thus, as described above, the interactive cable television system of the present invention has enhanced entertainment value and flexibility enabling true individualized interaction in the home by the individual subscribers in what is, in reality, a one way television transmission system having all of the resultant transmission advantages associated with such a one way television system including the capabilities that the information may be transmitted over microwave and/or satellite and that the number of participating subscribers has no effect at the head end.

It is to be understood that the above described embodiments of the invention are merely illustrative of the principles thereof and numerous modifications and embodiments of the invention may be derived within the spirit and scope thereof, such as by time multiplexing the prerecorded information to provide the aforementioned multi-information packets or by employing multiple scoring with tone discrimination among multiple receivers to enable a plurality of players to take part and be scored in the same game.

What is claimed is:

1. An interactive cable television system comprising
a plurality of subscriber television reception systems, each of said subscriber television reception systems comprising a multichannel television receiver, each of said multichannel television receivers having a plurality of different television reception channels, each of said television reception channels having a different associated communication frequency;
a cable television subscriber distribution network operatively connected to said plurality of subscriber television recepction systems; and
a cable television programming transmission means operatively connected to said subscriber distribution network for providing transmitted television programming thereto, said subscriber distribution networks providing said transmitted television programming to said plurality of subscriber television reception systems, said cable television programming transmission means comprising means for substantially simultaneously providing a multi-information television program communication signal along with at least one different regular television program information signal as said transmitted television programming to said subscriber distribution network; said multi-information television program communication signal comprising a plurality of multi-information packets, each multi-information packet comprising a plurality of simultaneously provided different program information message signals related in real time and content to each other, each of said related different program information message signals in said multi-information packet being at a different associated communication frequency different from each other, and different from said one regular television programming signal associated frequency, each of said related different program information message signal associated frequencies corresponding to a different television reception channel frequency and being directly receivable on the corresponding television reception channels; said one different regular television program information signal having an associated communication frequency corresponding to a different television reception channel frequency than said multi-information packet program information message signals and being directly selectably receivable on the corresponding television reception channel; each of said multichannel television receivers being capable of independently selectably receiving information on any one of said plurality of different television reception channels dependent on the television reception channel selected; each of said multichannel television receivers comprising a multichannel selection means for selecting the television reception channel associated frequency to be received, each of said television reception channels having a designated channel position indicator in said multichannel/selection means; at least one of said multi-information packets further comprising video information displayable on said multichannel television receiver corresponding to informational labels to be dynamically assigned to said designated channel position indicators for a particular multi-information packet, said television displayable informational labels being dynamically variable dependent on the content of said multi-information packet, whereby flexible multi-information television programming may be simultaneously provided along with regular television programming.

2. An interactive cable television system in accordance with claim 1 wherein at least a portion of said plurality of said individual multi-information packets comprising said multi-information television program communication signal are related to each other in real time and content with said portion of said plurality of time related multi-information packets being content related to each other in a decision tree relationship between successive individual packets and between program information message signals within said successive individual packets, whereby a memory accumulation program format may be received as said selectable multi-information television programming.

3. An interactive cable television system in accordance with claim 2 wherein said displayable informational labels dynamically vary in accordance with the successive decision free selections to be made.

4. An interactive cable television system comprising a plurality of subscriber television reception systems, each of said subscriber television reception systems comprising a multichannel television receiver, each of said multichannel television receivers having a plurality of different television reception channels, each of said television reception channels having a different associated communication frequency;
a cable television subscriber distribution network operatively connected to said plurality of subscriber television reception systems; and
a cable television programming transmission means operatively connected to said subscriber distribution network for providing transmitted programming thereto, said subscriber distribution network providing said transmitted television programming to said plurality of subscriber television reception systems, said cable television programming transmission means comprising means for substantially simultaneously providing a multi-information television program communication signal along with at least one different regular television program information signal as said transmitted television programming to said subscriber distribution network; said multi-information television program communication signal comprising a plurality of multi-information packets, each multi-information packet comprising a plurality of simultaneously provided different program information message signals related in real time and content to each other, each of said related different program information message signals in said multi-information packet being at a different associated communicaton frequency different from each other, and different from said one regular television programming signal associated frequency, each of said related different program information message signal associated frequencies corresponding to a different television reception channel frequency and being directly receivable on the corresponding television reception channels; said one different regular television program information signal having an associated communication frequency corresponding to a different television reception channel frequency than said multi-information packet program information message signals and being directly selectably receivable on the corresponding television reception channel; each of said multichannel television receivers being capable of independently selectably receiving information on any one of said plurality of different television reception channels dependent on the television reception channel selected; each of said multichannel television receivers comprising a multichannel selection means for selecting the television reception channel associated frequency to be received, each of said television reception channels having a designated channel position indicator in said multichannel/selection means; at least a portion of said plurality of said individual multi-information packets comprising said multi-information television program communication signal being related to each other in real time and content with said portion of said plurality of time related multi-information packets being content related to each other in a decision tree relationship between successive individual packets and between program information message signals within said successive individual packets, whereby a memory accumulation program format may be received as said selectable multi-information television programming.

5. An interactive cable television system in accordance with claim 1 wherein said subscriber distribution network is a one way television signal distribution network.

6. An interactive cable television system in accordance with claim 4 wherein said subscriber distribution network is a one way television signal distribution network.

7. A method for enabling a plurality of different continuous real time interactive conversational type responses to be substantially simultaneously provided from a plurality of multichannel information television receivers comprising a one-way common television signal distribution network, said method comprising the steps of:

simultaneously transmitting a plurality of separate contemporaneous complete television information messages in real time over a plurality of contemporaneous television channels to said plurality of multichannel television receivers through said one-way common television signal distribution network, each of said plurality of channels simultaneously containing said contemporaneous television information message thereon, a plurality of said channels of said contemporaneous television information messages comprising particular interrogatory messages and associated multiple choice selectible responses to each said particular interrogatory message, at least a plural portion of said plurality of contemporaneous television information message containing channels comprising responsive messages related in real time and content to each of said particular interrogatory messages and corresponding to said multiple choice selectible responses, only one of said plurality of contemporaneous channels comprising the correct selectible responsive message to each said particular real time related interrogatory message, said other channels further comprising instructional messages corresponding to selection of an incorrect responsive message which are related in real time and content to said particular interrogatory message;

providing said plurality of messages to be transmitted through said one-way common television signal distribution network over said plurality of channels from a common magnetic storage medium having a plurality of coextensive information tracks capable of having information messages stored thereon for playback therefrom, said stored information messages being simultaneously obtained from each of said coextensive tracks, said information messages being stored on each track in a plurality of reproducible information segments, each of said segments comprising a complete message reproducible from said track for providing said simultaneous transmission, said transmitted interrogatory messages and said associated multiple choice selectible responses to said particular interrogatory message being provided from said messages stored on said tracks, said transmitted real time and content related responsive messages corresponding to said multiple choice selectible responses being stored on at least a plural portion of said plurality of tracks, only one of said plurality of tracks comprising said correct selectible responsive message to said particular real time related interrogatory message, said plurality of other tracks other than said correct responsive message track for said particular interrogatory message comprising instructional messages corresponding to selection of said incorrect responsive message which are related in real time and content to said particular interrogatory message, a different one of said multiple choice selectible response message containing tracks containing the correct responsive message to at least a different one of said interrogatory messages;

individually selecting one channel at a given one of said receivers for providing one of said contemporaneous interrogatory messages from said given receiver; and individually interacting in real time with said provided contemporaneous interrogatory message by directly selecting one of said other contempraneous channels in response to said one provided interrogatory message in an effort to provide said correct selectible responsive message from said given television receiver, a different one of said multiple choice selectible responsive message containing channels containing the correct responsive message to at least a different one of said interrogatory messages, said transmitted interrogatory messages and said transmitted responsive messages being spacially related to each other in said simultaneous transmission in real time and further related to each other in content for providing a responsive message dependent on the channel selected for providing a conversational real time interactive environment over said one-way common distribution network, a different receiver in said plurality of receivers being capable of individually selecting a different channel from that selected by any other receiver for enabling individual independent interaction in real time with said commonly provided related information messages through said different receiver, whereby multiple users of said one-way common distribution network may individually interact in real time to obtain individualized conversational type responses.

8. A method in accordance with claim 7 wherein said simultaneous transmission step further comprises additionally simultaneously transmitting regular programming over still other of said plurality of contemporaneous channels to said plurality of television receivers.

9. A method in accordance with claim 7 further comprising the step of additionally transmitting regular television programming to said plurality of television receivers over at least a portion of said same plurality of contemporaneous channels over which said plurality of separate contemporaneous television information messages are transmitted.

10. A method in accordance with claim 7 wherein said simultaneous transmission step further comprises simultaneously transmitting video messages related in content to audio messages as said television information messages over said one-way common television signal distribution network, said video messages being individually displayable by said television receivers in real time in conjuction with said audio message dependent on said television information message selected by each of said television receivers.

11. A method for providing a dynamically variable interactive response over a multichannel television receiver from a common multichannel recording medium for enabling a user to dynamically vary the total story content of a prerecorded story in real time, said method comprising the steps of providing a magnetic recording medium having a plurality of coextensive television information tracks capable of having television information stored thereon for a playback therefrom; storing said information on each of said tracks in a plurality of reproducible information segments, each of said segments comprising a complete message reproducible directly in response to selective playback of said track upon which said segments are stored, one of said tracks stored information comprising primary interrogatory messages amd associated multiple choice selectible derivative secondary interrogatory containing messages related in content to a particular primary interrogatory message, a plurality of said other tracks comprising derivative secondary interrogatory containing messages related in real time and content to said one track primary interrogatory messages and corresponding to said multiple choice selectible derivative secondary interrogatory containing messages, each of said plurality of other tracks comprising a different derivative secondary interrogatory containing message, said plurality of other tracks further comprising associated multiple choice selectible responsive messages related in real time and content to each of said plurality of derivative secondary interrogatory containing messages, only one of said plurality of other tracks comprising a unique selectible responsive message to a particular one of said real time related derivative secondary interrogatory messages, said derivative secondary interrogatory messages being chain linked in content to a particular primary interrogatory message, said stored primary and derivative secondary interrogatory messages and said associated responsive messages being spatially related to each other along said storage medium tracks in real time and further related in content to one another for providing a transitional derivative response to said primary interrogatory message dependent on the track selected for reception by the multichannel television receiver and the real time of said selection for providing a conversational real time transitional environment, said primary interrogatory message comprising said story theme, and said secondary derivative interrogatory messages each comprising multiple choice selectible different story scenario options for said story theme, and said associated responsive messages comprising a further different scenario in said story theme for providing a different selectible total story content for said story theme dependent on said selected option and subsequently selected associated responsive message, whereby said user may actually have a part in formulating a story television reception and in helping to dynamically determine its outcome which may be varied in real time from user to user over a commom television signal distribution network for said prerecorded story.

12. A method in accordance with claim 11 wherein said primary interrogatory message comprises a plurality of multiple choice selectible different interrogatory messages each compromising a different category of question, each of said different categories of questions being associated with a different one of said plurality of other selectable tracks, said secondary derivative interrogatory messages corresponding to said different categories of questions whereby a plurality of different interrogatories are simultaneously selectible, said associated responsive messages comprising a common set of responsive messages for each of said different selectible secondary derivative interrogatory messages.

13. A method in accordance with claim 12 wherein one of said secondary derivative interrogatory messages comprises a true/false type question and another of said secondary derivative interrogatory messages comprises a multiple choice type question.

14. A method for providing a limited memory type conversational interactive response in real time over a multichannel television receiver from a common mutlichannel recording medium comprising the steps of providing a magnetic recording medium having a plurality of coextensive television information tracks capable of having television information stored thereon for playback therefrom; storing said information on each of said tracks in a plurality of reproducible information segments, each of said segments comprising a complete message reproducible directly in response to selective playback of said track upon which said segments are stored, one of said tracks stored information comprising primary interrogatory messages and associated multiple choice selectible derivative secondary interrogatory containing messages related in content to a particular primary interrogatory message, a plurality of said other tracks comprising derivative secondary interrogatory containing messages related in real time and content to said one track primary interrogatory messages and corresponding to said multiple choice selectible derivative secondary interrogatory containing messages, each of said plurality of other tracks comprising a different derivative secondary interrogatory containing message, said plurality of other tracks further comprising associated multiple choice selectible responsive messages related in real time and content to each of said plurality of derivative secondary interrogatory containing messages, only one of said plurality of other tracks comprising a unique selectible responsive message to a particular one of said real time related derivative secondary interrogatory messages, said derivative secondary interrogatory messages being chain linked in content to a particular primary interrogatory message, said stored primary and derivative secondary interrogatory messages and said associated responsive messages being spatially related to each other along said storage medium tracks in real time and further related in content to one another for providing a transitional derivative response to said primary interrogatory message dependent on the track selected and the real time of selection for providing a conversational real time transitional environment, each of said plurality of tracks containing both a successively stored instructional message directly referring to the previously selected responsive message and indicating the correctness of said previously selected responsive message and a successively stored subsequent different multiple choice selectible primary interrogatory message spatially related in real time to said responsive messages, said previously selected responsive message being associated with a precedingly stored primary interrogatory message, said other tracks further comprising a second common set of selectible responsive messages associated with said subsequent different primary interrogatory messages, and subsequent different multiple choice selectible primary interrogatory message being spatially related in real time along said storage medium tracks to said previously selected responsive message for providing said subsequent primary interrogatory message subsequent to selection of said responsive message associated with said precedingly stored primary interrogatory message, whereby a variable type of limited memory type conversational environment is provided for a plurality of television subscribers over a common television signal distribution network for said prerecorded information.

* * * * *